July 16, 1968  M. S. LANE  3,392,687
PIZZA FORMING MACHINE
Filed Oct. 23, 1965  3 Sheets-Sheet 1

INVENTOR.
Malcolm S. Lane
BY
Walter G. Finch
ATTORNEY

July 16, 1968 M. S. LANE 3,392,687
PIZZA FORMING MACHINE
Filed Oct. 23, 1965 3 Sheets-Sheet 3

INVENTOR.
Malcolm S. Lane
BY
Walter G. Finch
ATTORNEY

United States Patent Office 3,392,687
Patented July 16, 1968

3,392,687
PIZZA FORMING MACHINE
Malcolm S. Lane, Baltimore, Md., assignor to American Home Products Corporation, New York, N.Y., a corporation of Delaware
Filed Oct. 23, 1965, Ser. No. 503,151
1 Claim. (Cl. 107—15)

ABSTRACT OF THE DISCLOSURE

The invention is directed to apparatus for forming dough into pizza shells. The apparatus comprises a lower member supporting a dough-containing, inverted mold pan, an upper member reciprocally movable into sealing engagement with the lower member, and a piston recessedly mounted in the upper member and movable by air pressure to gently press the dough to a predetermined configuration. The upper and lower members are rotated during pressing to aid in the formation of the characteristic pizza shape and texture.

---

This invention relates generally to bread making apparatus, and more particularly it pertains to a machine for forming pizza shells.

Pizza dough, unlike pie dough, has an organic leavening. Accordingly, it is more sensitive to handling. The prior use of molding apparatus of the expressing type resulted in an unsatisfactory product because it required some 350 to 400 p.s.i. for the dough to flow and this damaged the leavening.

It is an object of the present invention to provide a machine for forming pizza shells which is fast, efficient, and automatic and which does not subject the dough to damaging pressures.

Another object of this invention is to provide a machine for forming pizza dough shells by spinning for improved texture of the product.

Other objects and attendant advantages of this invention will become more readily apparent and understood from the following detailed specification and accompanying drawings in which.

Figure 1:
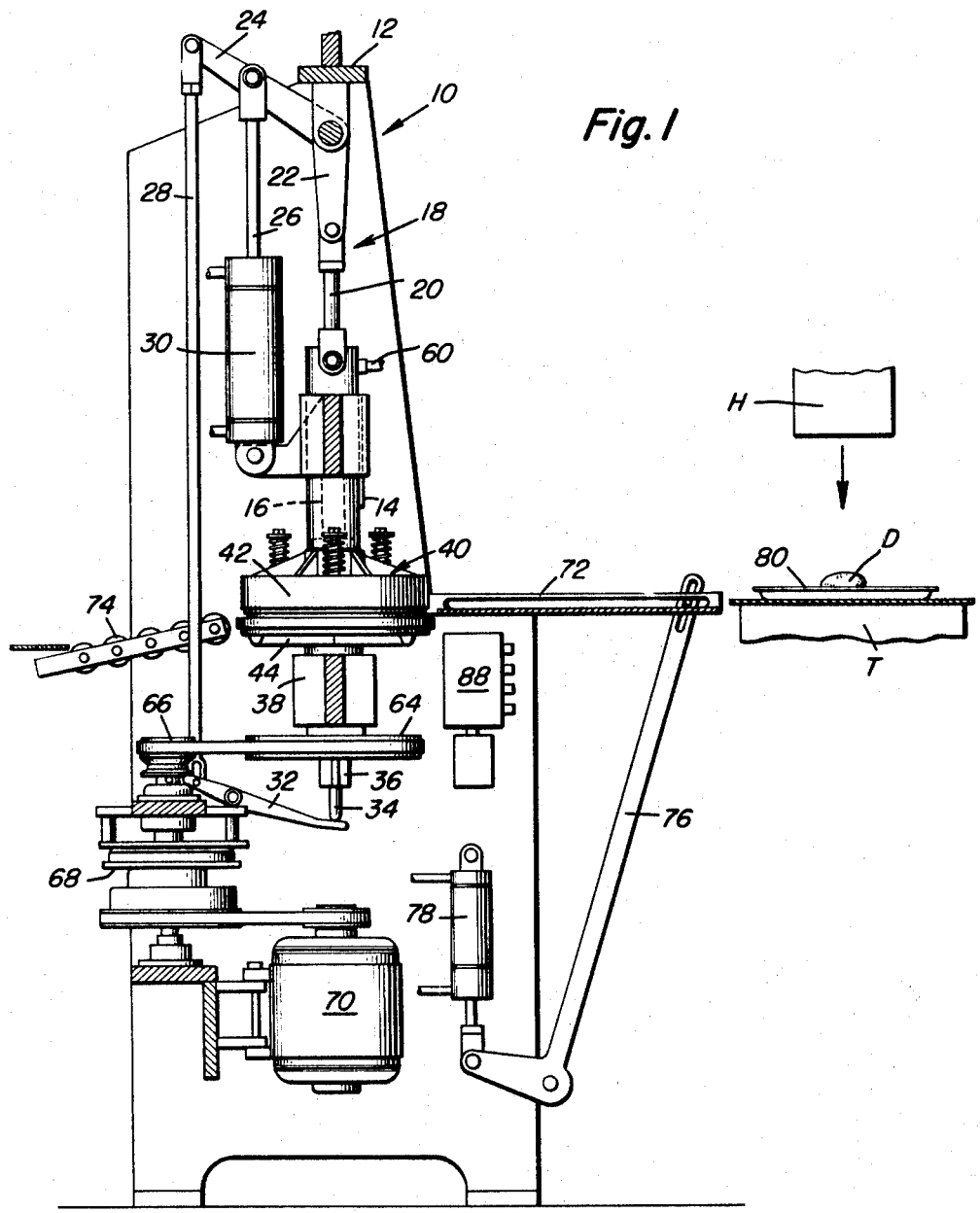
FIG. 1 is a view in elevation of a pizza shell spinning machine.

Referring now to the details of the drawings as best shown in FIG. 1, reference numeral 10 indicates generally a pizza shell forming machine. This machine 10 consists of a heavy frame 12 on which is mounted a vertical movable quill 14. A spindle 16 inside is journalled for rotation within, and vertical movement with, the quill. The quill 14 is connected at the upper end to a toggle assembly 18 and at the lower end its spindle 16 is attached to a head, or upper member, 42. The toggle assembly 18 comprises a link 20 and a bell crank 22 articulated together, the latter being pivoted at its mid point to the frame 12.

The driving end 24 of the bell crank 22 has two thrust rods 26 and 28 attached thereon by clevis joints. One rod 26 is the piston rod of a hydraulic actuator cylinder 30 which is mounted on the frame 12.

The other thrust rod 28 extends downward to engage one end of a center-pivoted lever 32. The other end of this lever 32 supports a shaft 34 keyed to and slidably extending from a lower spindle 36. This spindle 36 is journalled in a bearing 38 on the frame and located so as to be co-extensive with the axis of the quill 14 above.

A chuck assembly 40 is positioned between the upper and lower spindles 16 and 36. As best shown in conjunction with FIGS. 1, 2, and 3, the chuck assembly consists of an inverted cup-shaped head 42 and a bottom cup 44 of the same diameter. The bottom cup, or lower member 44 is attached to the top end of the lower spindle 36 and has a center aperture through which the shaft 34 extends. A spider 46 is positioned in the cup 44 and attached to the top end of shaft 34. The fingers 48 of spider 46 extend radially and normally lie in slots cut in the bottom of the cup 44.

A circular disc piston 52 having a piston ring 54 is supported in the head 42 of the chuck assembly 40 on three spaced piston rods 56. These rods 56 extend through the top of the head 40 and are urged upward by means of three compression coiled springs 58 mounted thereon. Thus normally the piston 52 is held deep up in the recess of the head 42.

A flexible air line 60 connected to quill 14 communicates with an axial passage 62 in the upper spindle 16 and provides motive power whenever the piston 52 is to be moved downward inside the head 42.

The lower spindle 36 (together with the spider 46 and cup 44) are rotated by means of a pulley 64 which is belted to a drive pulley 66. The latter pulley 66 extends from an electrically operated clutch-brake 68. A continusously-running motor 70, in turn, is belted to the clutch-brake 68.

A feed table 72 extends horizontally from the machine 10 at one side of the chuck assembly 40. A discharge ramp 74 extends on the opposite side. The feed table 72 has a sweep arm 76 which connects with a linkage to the piston rod of a hydraulic cylinder 78. As may be seen in FIGURES 1 and 2, a mold pan 80 is utilized to transport dough into and out of the machine and to aid in forming the dough while in the machine. As may be seen in the drawings the mold pan 80 is comprised of a planar central portion 80A, an annular depressed portion 80B, an annular sealing portion 80C, 80D, and an outer rim 80E. The annular depressed portion 80B surrounds the planar central portion 80A and extends at its lowest extreme below the level of the planar central portion 80A.

The annular sealing portion is further comprised of two portions. The first sealing portion 80C is substantially an inverted truncated cone and extends upwardly from the annular depressed portion 80B to a plane above the planar central portion and supports the second sealing portion 80D. The second sealing portion 80D is annular and lies in a plane above the planar central portion 80A. The rim 80E adjoins the outer periphery of the second sealing portion 80D, and is disposed at substantially right angles downwardly from the second sealing portion 80D.

In operation, a mold pan 80 on a preparation table T is charged with a lump of pizza dough D from a hopper H and then manually placed on the feed table 72. A timer 82 completing an operation cycle has caused cylinder 30 to raise the head 42 of the chuck assembly 40 away from the bottom cup 44. The sweep arm 76 now is actuated by the cylinder 78 stroking downwardly pushing the charged mold pan 80 into position on the raised spider 46 in cup 44. The cylinder 30 drops the spider 46 and through toggle action moves the head 42 downwardly to engage the second sealing position 80D of the mold pan 80 tightly against the rim of the bottom cup 44. As may be seen in FIGURE 2, a section of rubber or such material 42A forms the lowest edge portion of head, or upper member, 42 and engages the second sealing portion 80D of the mold pan 80. In operation when the head, or upper member, 42 is tightly engaged against the bottom cup, or lower member, 44 a seal is effected by the sealing action of the lowest edge portion 42A of head, or upper member, 42 against the second sealing portion 80D of the mold pan 80 forming the uppermost portion of bottom cup, or lower member 44.

Figure 2:
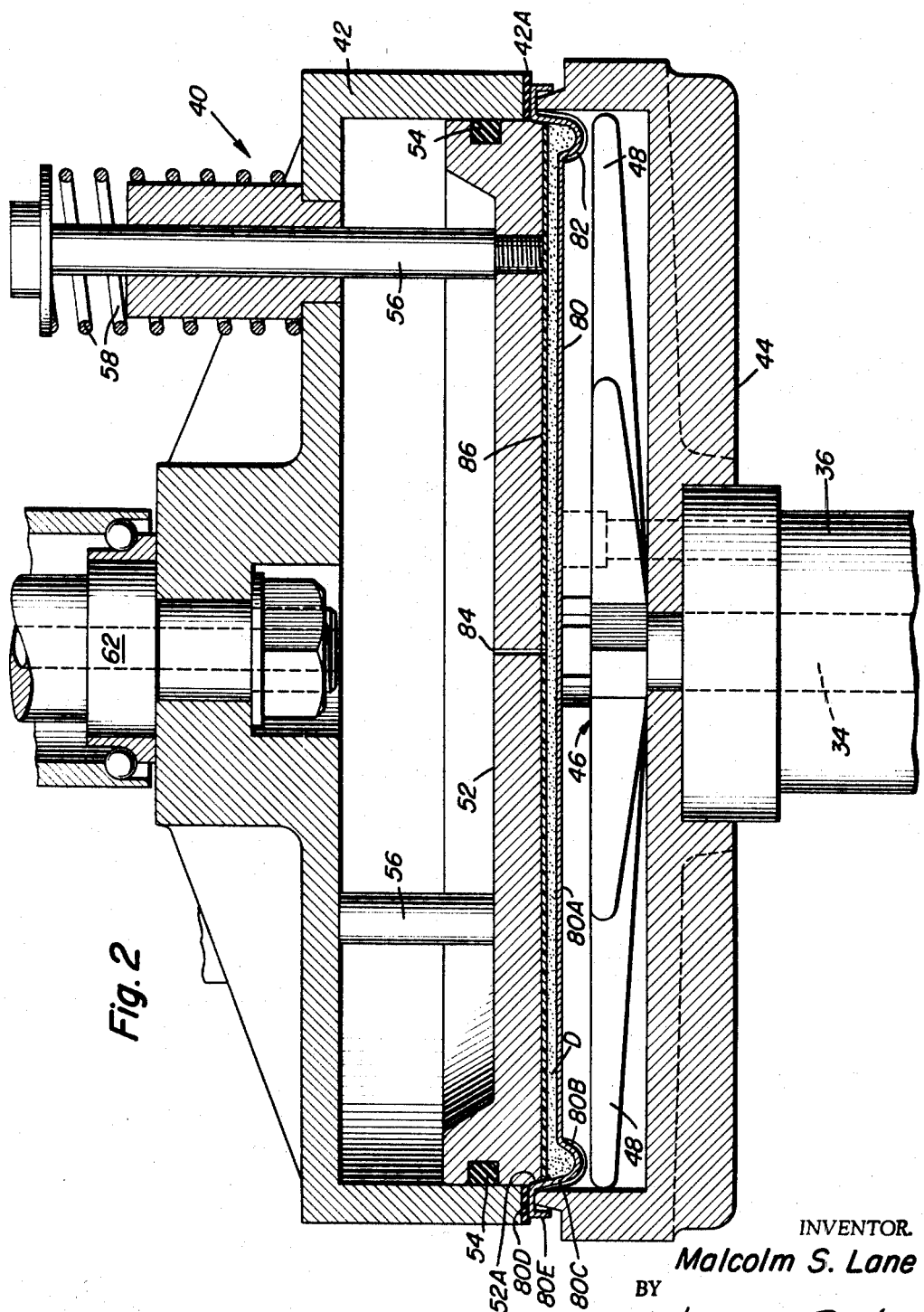
FIG. 2 is a vertical section of a chuck for the machine of FIG. 1 showing the closed position thereof.
Figure 3:
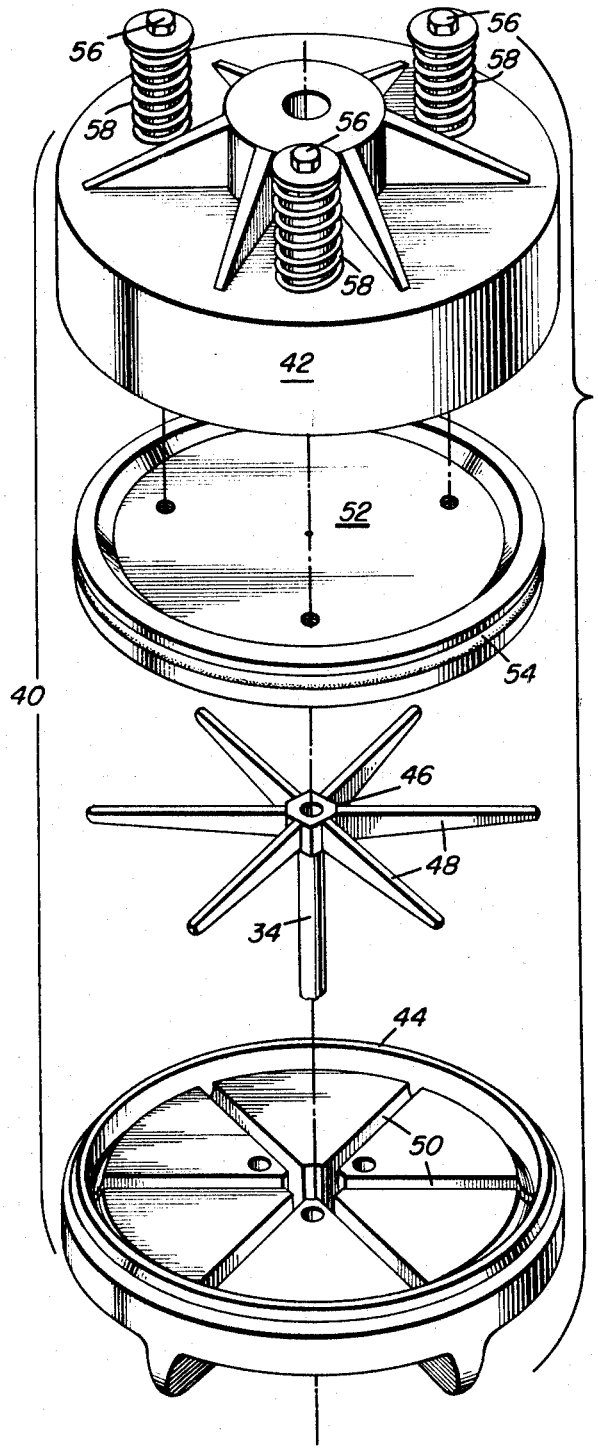
FIG. 3 is an exploded view of the chuck of FIG. 2.

Next, clutch 68 is energized by the timer 82 causing the entire chuck assembly to rotate at 300 to 500 r.p.m. Also at this time compressed air is introduced through air line 60 and passage 62 into the head 42 causing piston 52 to exert light pressure of about 50 p.s.i. on the dough D in the pan 80. The closed position is shown in FIGURE 2. In the closed position the head, or upper member, 42 is in sealing engagement with the mold pan 80 forming part of the bottom cup, or lower member, 44. Also, in the closed position, the piston 52 is at its lower limit of travel. As may be seen in FIGURE 2, the outer periphery 52A of the piston 52 engages the inner surface of the first sealing portion 80C of the mold pan 80, thus defining a chamber shown filled with dough, D in FIGURE 2. Due to the shape of the piston 52 and the mold pan 80, the chamber has the characteristic shape of a pizza shell and dough disposed therein is formed into the characteristic shape of a pizza shell. As may be seen in FIGURE 2, the pizza shell is formed in an inverted configuration.

The combination of gentle pressure and centrifugal force causes the dough to flow rapidly outward to fill the mold pan 80 and its outside depressed rim 82. After a spin duration of from 3 to 6 seconds, the pizza is completely and uniformly formed with no damage to its leavening.

At the end of the spin cycle, the electric clutch-brake 68 is deenergized and set, stopping the spin of chuck assembly 40. Simultaneously, cylinder 30 begins to stroke downwardly, the air pressure within head 42 is relieved and the latter rises. Residual pressure flows through a plurality of vent holes 84 in the piston 52 causing the dough to release from the Teflon face 86 thereof. Also as is apparent from an inspection of FIGURE 2, as the air pressure within head, or upper member, 42 is relieved, the three coiled springs 58, acting through rods 56, urge the piston 52 upwardly to its starting position deep up in the recess of the head, or upper member, 42, as described above.

The mold pan 80 with the completed pizza remains on the bottom cup 44 until nearly the end of the stroke of cylinder 30 whereupon spider 46 is raised by the rod 28 and lever 32.

Figure 4:
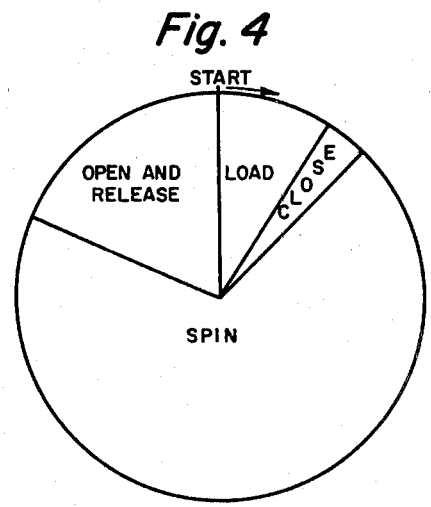
FIG. 4 is a time chart depicting the automatic sequence of operation of the machine of FIG. 1.

The next pan 80 coming in at the start of the following cycle of operation under urging from sweep arm 76 displaces the first pan 80 onto the discharge ramp and replaces it on the raised spider 46. FIG. 4 diagrammatically illustrates this cycle of operation.

Obviously, many modifications and variations of the present invention are possible in light of the above teachings. It is, therefore, to be understood that within the scope of the appended claim the invention may be practiced otherwise than as specifically described.

What is claimed is:
1. Apparatus for forming pizza dough into a form characteristic of pizza shells comprising:
 (A) A supporting frame;
 (B) A lower member connected to said frame and adapted for rotation about an axis;
 (C) A removable mold pan supported by said lower member,
  (1) A planar central portion defined in said pan;
  (2) An annular depressed portion defined in said pan, surrounding said planar central portion and extending at its lowest extreme below the level of said planar portion;
  (3) An annular sealing portion defined in said pan surrounding said depressed portion and extending above the level of said planar portion;
 (D) An upper member connected to said frame, said upper member being adapted to rotate about the same axis as said lower member, said upper member being adapted to rotate about the same axis as said lower member, said upper member being adapted for vertical reciprocal motion, and at the lower extent of said reciprocal motion being adapted to sealably engage the sealing portion of said pan;
 (E) A piston disposed within said upper member and adapted for vertical motion within said upper member; said piston at the limit of its upward travel defining a chamber adapted to contain the pizza dough when said upper member is in sealing engagement with said pan, and at its lower limit of travel to define a chamber with said pan conforming to the desired shape of a pizza shell;
 (F) First piston operating means adapted to move said piston to its upward limit of travel; and
 (G) Second piston operating means adapted to move said piston to its lower limit of travel independent of the movement of said upper member.

References Cited
UNITED STATES PATENTS

| | | | |
|---|---|---|---|
| 1,757,447 | 5/1930 | Comstock | 107—19 X |
| 2,387,839 | 10/1945 | Frost | 100—266 |
| 2,624,296 | 1/1953 | Nuttall | 107—15 |
| 2,664,834 | 1/1954 | Balton | 107—15 |
| 2,786,409 | 3/1957 | Claire | 100—266 |
| 3,136,268 | 6/1964 | Gageant | 107—15 X |
| 3,190,758 | 6/1965 | Hauf | 107—15 X |
| 3,307,502 | 3/1967 | Armour | 107—15 |

WALTER A. SCHEEL, *Primary Examiner.*

A. O. HENDERSON, *Assistant Examiner.*